United States Patent [19]

Hase

[11] 3,848,173

[45] Nov. 12, 1974

[54] STORAGE BATTERY CHARGING APPARATUS

[76] Inventor: Alfred Max Hase, 6 Manorwood Rd., Scarborough, Ontario, Canada

[22] Filed: Nov. 8, 1972

[21] Appl. No.: 304,858

[52] U.S. Cl............... 320/23, 320/37, 320/39
[51] Int. Cl............................. H02j 7/04
[58] Field of Search............... 320/2, 22–24, 320/37, 38, 39, 40, 48, 31–34; 312/326–328, 22, 23

[56] References Cited
UNITED STATES PATENTS

| 1,692,064 | 11/1928 | Trogner | 312/22 X |
| 2,101,571 | 12/1937 | Breisch | 320/2 UX |
| 2,565,273 | 8/1951 | Shuler et al. | 320/2 |
| 3,153,186 | 10/1964 | Medlar | 320/38 X |
| 3,217,225 | 11/1965 | Gottlieb et al. | 320/31 UX |
| 3,323,803 | 6/1967 | Pawlikowski et al. | 312/328 X |
| 3,517,295 | 6/1970 | Lapuyade | 320/23 X |

Primary Examiner—J. D. Miller
Assistant Examiner—Robert J. Hickey

[57] ABSTRACT

A battery charging apparatus has a control circuit which controls the rate of input AC power through a synchronous switch - a saturable core reactor, magnetic amplifier or a pair of anti-parallel silicon controlled rectifiers. The operation of the charger is initially constant current, but has a tapered, constant voltage transition to a continuous controlled trickle charge. A monitor and override circuit is timed, and initiates step-function transfers to lower constant current charging rates at various times throughout the charging program if the charging rate at the time of any such step function transfer is higher than the level to which the rate will be transferred. A status indication may be provided if a step transfer occurs.

9 Claims, 8 Drawing Figures

3,848,173

STORAGE BATTERY CHARGING APPARATUS

FIELD OF THE INVENTION

This invention relates to storage battery charging apparatus. More particularly, the invention relates to control circuits for battery chargers, especially industrial battery chargers, having a tapered transfer characteristic from an initial constant current, high rate charging characteristic to a continuous, constant current trickle charge; and having timed override monitor and control characteristics.

BACKGROUND OF THE INVENTION

Heavy duty industrial battery chargers are employed in many different types of operations — such as heavy industry, food processing and storage, etc. — all of which may be use "industrial trucks" such as battery-powered pallet tractors, fork lift trucks, etc. The batteries in such industrial trucks may have amp-hour ratings of from 200 amp-hours to 1,800 amp-hours, and they may have anywhere from six to 36 cells. Such storage batteries are of the lead-acid type, and usually have a terminal voltage per cell, when fully charged, of from 2.4 to 2.6 volts. During use, an industrial storage battery or bank of storage batteries in an industrial truck may have its charge reduced virtually to zero; but such fully discharged battery may be required for use the following day, so that it must be fully recharged in the shortest possible time and without overheating. Thus, the need exists for battery chargers having suitable charging characteristics, and sufficient charging rates and voltages. Normally, however, an industrial battery charger is specifically designed only for batteries having one particular amp-hour rating; and such industrial battery chargers are adapted to recharge or back-charge a storage battery of the designated size and rating in a given period of time — usually 8 to 12 hours.

There are several modes of operation of industrial battery chargers. Most often, industrial battery chargers are of the constant current type, which are adapted to deliver a charging current to a storage battery at a substantially constant rate. Such constant current chargers usually operate at two charging rates, an initial charging rate which is a high current, and a final charging rate which is a relatively low current. The transfer from high current to low current operation is a setp function or step transfer characteristic, and is normally initiated by a voltage monitoring circuit and a relay which switches the current control circuitry within the charger at a specific terminal voltage per cell of the battery. However, constant current chargers require sophisticated circuitry to compensate for line voltage variations; and because of their essentially constant current output they must have a timed override capable of transferring from high to low output levels so as to prevent overcharging the storage battery. Overcharging a storage battery may cause plate rupture, high gas pressure with possible explosive consequences, overheating, and other damage to the equipment and batteries.

The other usual mode of operation of industrial battery charges is taper charging, which is characterized by an initially very high charging current output which tapers because of the nature of the current output control within the charger until a specific voltage per cell of the battery is reached, whereupon a low-current output characteristic of the charger is initiated. The monitoring and transfer circuitry of a tapered charger which initiates the transfer from high to low current output is essentially the same as in a constant current charger, and the transfer from high to low output current is a step function of the charger. The output current during low current operation of a taper charger is controlled by a ballast resistor or a linear reactor; and taper chargers as well as constant current chargers are also usually equipped with a total shut-off at a given time, so as to avoid overcharging the storage battery.

Suitable temperature compensating circuitry, line regulation circuitry, etc., can be inserted in any industrial battery charger. However, because the constant current charger and the taper charger both have step transfer from high current to low current modes of operation, the circuitry and relays which control the step transfer must be essentially fail-safe in order to assure that the transfer to low current output occurs. Unfortunately, the equipment and circuitry normally used for such control can easily be triggered by vibration or shock, so that the transfer may be initiated much too early, and if that occurs, a full charge of the storage battery is not achieved or is not fail-safe, thereby leading to overcharging of the battery.

The present invention recognizes that during the early stages of recharging or back-charging a storage battery, constant current high level charging rate provides the best performance — with the best protection for the battery — and at the same time precludes high DC shocks to the battery and excessively high peak power consumption. Further, the invention recognizes that when the voltage level per cell of a lead-acid industrial storage battery reaches approximately 2.4 volts, it is best to alter or switch the mode of operation of the charging equipment so as to provide for constant voltage charging at a steadily decreasing output current rate until the battery is substantially fully charged or until a given amount of time has expired, after which a constant current, regulated trickle charge is initiated. It is important to maintain a trickle charge on an industrial battery during long weekends, holidays, labour stoppages etc.; to prevent internal discharge, sulfation, etc., of the battery.

As discussed hereafter the invention recognizes that batteries having different sizes and amp-hour ratings require different charging rates, but the principle remains that a constant potential charging mode which transfers the operation of the storage battery charging apparatus from a high level to a low level or trickle charging mode provides the greatest protection for storage batteries having the designated ratings for which any one storage battery charging apparatus may be adapted. The invention also provides means by which storage batteries having the same voltage ratings but somewhat different amp-hour ratings than the name plate rating, may also be charged by any one specific charger, within limits, by altering certain of the control characteristics and parameters of the charger. Thus, so as to overcome the serious disadvantages of former battery chargers which operated solely as constant current chargers having high and low outputs, or taper chargers having high and low outputs, the present invention provides constant current charging at the high level with a tapered, modified constant potential transfer from high output to low output, and a regulated, continuous, constant current trickle charge.

The present invention also recognizes that the operator of battery powered industrial equipment whose batteries are charged by the present apparatus may wish to know if there has been high current charging to the battery after a length of time when such high current should normally have fallen off to a relatively low current. A modification of the control circuits taught by this invention is therefore provided, with that capability.

While all manufacturers of industrial battery charging apparatus attempt to provide components which are maintenance free, it nevertheless becomes necessary at times to open the cabinet of a battery charging apparatus for maintenance, or in any event for cleaning. Normally this requires the removal of a front panel which may be rack mounted with a cabinet, or opening of a door, and the disconnection of controls or meters that are on the front panel from the interior of the cabinet. In any event, such equipment requires that service or maintenance be carried out within the cabinet, usually with limited access and in restricted space. The present invention provides, in another aspect, a cabinet for a battery charging apparatus and the like having a "swing-down" front panel which is recessed from the front of the cabinet so as to provide protection for indicating instruments and control switches that may be mounted on the front panel, and which can be opened upon actuation of suitable interlocks but without the necessity for electrical disconnection of meters and controls on the panel. Further, the cabinet for a storage battery charging apparatus that is provided by this invention is such that the swing-down front panel is so situated and has component parts of the circuitry of the storage battery charging placed thereon in such a manner that the front panel is essentially balanced. That is, when the front panel is substantially half-way closed — or half-way through the arc which it is permitted to swing — the centre of gravity of the components mounted on the front panel is just slightly behind the axis of the hinges about which the front panel swings so as to positively assure a closing operation of the panel. Also, by presenting major components on the "swing-down" front panel, there is easier access to the interior of the cabinet; and service and maintenance of all components including the easily accessible panel-mounted major components is assured. Thus, maximum accessibility and maintainability of the equipment mounted in the equipment cabinet is readily achieved.

Still further, the cabinet design of the present invention is such that a storage battery charging apparatus may be provided having convection cooling. This is accomplished essentially by providing vent means at the top of the front of the cabinet, free access to the interior of the cabinet at the bottom of the front of the cabinet; and also by providing further venting means at the rear of the cabinet and possibly at the sides thereof. By providing for convection cooling of a storage battery charging apparatus, the necessity for fans and radiators is precluded, and depending on weight and space limitations — as well as strength limitations of the cabinet — the cabinet may be stacked as well as placed close together in a side-by-side arrangement, thereby achieving a very high "packing density" of battery charging capacity per unit volume of otherwise useful warehousing or manufacturing space.

BRIEF SUMMARY OF THE INVENTION

It is a purpose of this invention to provide a storage battery charging apparatus which has a constant current high charging rate and a continuous regulated constant current trickle charge, together with a controlled and tapered constant voltage transition from high current output to low current output; and also having fail-safe current and voltage monitoring circuitry as well as overriding provisions for initiating constant current output at predetermined times and having predetermined current values in the event that the output current is higher at any time than the predetermined value which is set for that time in the charging program.

Another object of this invention is to provide a storage battery charging apparatus for lead-acid industrial truck batteries, which has means for altering the charging program and values of any given charger from its name plate ratings, within limits, to accomodate other batteries having different sizes and amp-hour ratings, — where the number of cells of such other batteries is the same as for the battery for which the charger circuitry was originally intended.

A further object of this invention is to provide a storage battery charging apparatus particularly for industrial purposes and having indicator means which are operative in the event of an override function becoming operative, so as to provide a warning of an abnormal battery condition, thereby providing a status report as to the condition of the battery being charged.

Still another purpose of this invention is to provide a cabinet for a storage battery charging apparatus or the like, having a "swing-down" front panel on which may be mounted a number of the components of the charger circuit, but which is arranged so that at approximately one-half of the arc through which the swing-down front panel is permitted to swing, the centre of gravity of the equipment mounted on the front panel is behind the hinges about which its swings so as to positively assure a closing action of the front panel; and so as to provide maximum accessibility, and maintainability of the equipment mounted in the equipment cabinet.

Yet another object of this invention is to provide a cabinet for a storage battery charging apparatus having air inflow means and vent means such that the circuit components mounted within the cabinet can be convection cooled.

BRIEF DESCRIPTION OF THE DRAWINGS

These and other features and objects of the invention will be more clearly described hereafter, in association with the accompanying drawins, in which.

DESCRIPTION OF THE PREFERRED EMBODIMENT

Figure 1:
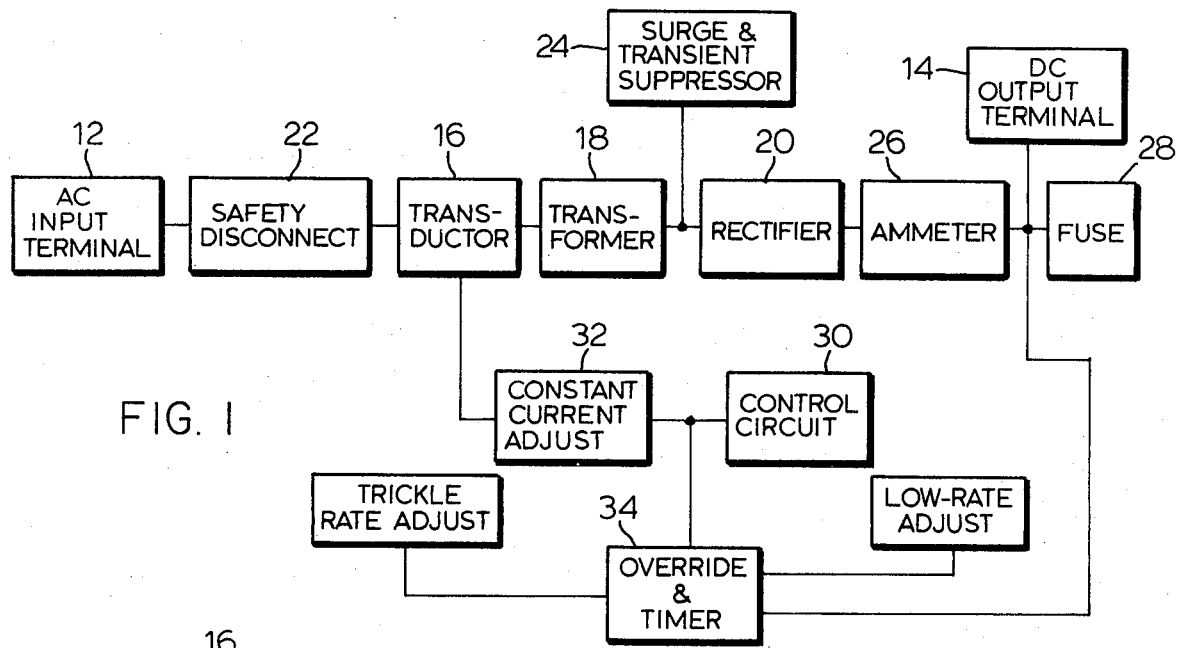
FIG. 1 is a block circuit diagram showing the basic circuitry of a storage battery charger according to this invention.

A battery charging apparatus in accordance with this invention is adapted at its input to be connected to a source of electrical energy 12, and has an output 14 adapted to be connected to the terminals of a storage battery. In the ininput section of the battery charging apparatus, there is included an ampere-turns transductor — such as a saturable core reactor or a magnetic amplifier; or the equivalent SCR circuitry — generally designated at 16. The ampere-turns transductor is of the sort having a control coil, as discussed hereafter. So as to provide the correct voltage at the output terminals 14, a power transformer 18 is included, as well as a full wave rectifier 20. A full wave rectifier in a battery charging apparatus of the sort contemplated by this invention would usually incorporate silicon rectifier stacks rather than selenium or other materials, because of the inherent aging characteristic of selenium rectifier stacks, but any suitable rectifier elements may be used. In the usual circuits, there is also included in the electrical power string from the AC input to the DC output a fused safety disconnect or breaker 22, a surge and transient suppressor 24, a DC ammeter (and shunt when required) 26 and a DC fuse 28. Also in the circuit, between the output and the ampere-turns transductor 16 is a control circuit generally indicated at 30, and means for constant current adjustment of the transductor, indicated at 32. There is also an override and timer circuit indicated generally at 34, for the purposes discussed hereafter.

Broadly stated, the ampere-turns transductor 16 — which may be a magnetic amplifier or a saturable core reactor — has a control coil whose operation is such as to affect the rate of electrical energy input to the battery charging apparatus from the source 12. Source 12 is, of course, an alternating current source of suitable voltage and frequency, and may have one or a plurality of phases. Operation of the control coil of an ampere-turns transductor is such that the average amount of power (rate of electrical energy input) passed by the transductor in each half-cycle is a function of the saturation of the core as determined by the state of conductance of the control coil, and the period of such conductance. Thus, when the power input reduces under the influence of the control coil whose conductance is controlled in the manner discussed hereafter, it may be considered that the average period of the conductance of the control coil is reducing.

The ampere-turns transductors may be replaced with a pair of oppositely facing silicon controlled rectifiers, in parallel; and the transductor control coil is then replaced with firing circuitry to reduce the firing angle of the SCR's so as to reduce power input to the charging apparatus in the same manner as the control coil operates. The operating period of the firing circuitry reduces as the firing angle of the SCR's reduces. Any ampere-turns transductor having a control coil, or any controllable pair of SCR's may be broadly considered as being controllable synchronous switches because they operate in synchronism with the AC power source; and the rate of electrical energy input (power input) is therefore controlled by controlling the operating period of the synchronous switch.

As mentioned above, the storage battery charging apparatus of the present invention has a multi-rate charging current output program, including a high charging rate at the beginning of the program, a controlled and tapered transition from high to low charging rate, and a continuous trickle charging rate at the end of the program until the battery is disconnected or the charging program is otherwise terminated. Because of the nature of the control circuitry, the high charging rate and the trickle charging rate are each substantially constant current, although at much different output levels. In general terms, the control circuit 30 controls the transition from high output to low output of the battery charging apparatus, and includes voltage reference sensing elements and elements which shunt a resistor across the control coil of the transductor or the control circuitry of a pair of SCR's, so as to control the rate of power input depending on the voltage being sensed. The storage battery charging apparatus also includes a timer and override means which initiates a transfer from high to low level output charging current, or from low level to trickle output charging current at specific times as determined by a timed program which is under control of a timer. The timer and override circuits therefore include switches operable at different times during the charging program by the timer to connect fixed resistances into the circuit across the control coil of the transductor, thereby limiting the current throughout of the transductor and the output current of the battery charging apparatus to not more than a predetermined value at an given time.

The timer and the controlled current charging rates, of which there are three if all are operative, are normally chosen in any given circumstance so as to provide for full charge of a totally discharged battery having maximum amp/hour ratings within the name plate limitations of any specific battery charging apparatus. In the normal circumstance, however, the timed low rate charging override — the level of which is considerably lower than the high rate charging current but higher than the trickle charging rate — is not operative although it is in the circuit, because in the normal circumstances a battery being charged would be more fully charged at the initiation of a low rate override than the rate of the low rate override would determine. In other words, the low rate override provides additional protection against serious damage to the batteries being charged, by preventing them from receiving a high charging rate over a prolonged period of time. In the event, however, that the low rate override becomes operative — ie., that the override acts to reduce the charging level of the output current from the charging apparatus — it is useful for the operator or owner of the battery being charged to know that such a condition has happened. Usually, in those conditions, the low rate override becomes operative because the battery may have been very old, because the specific gravity of the electrolyte was very low, because of internal or external leakage from the battery, shorted cells, or excessively high battery temperature. In any event, all such conditions are such as to require consideration of the state and condition of the battery, and the battery charging apparatus of this invention thereby provides means to indicate battery malfunction or the possible necessity for battery replacement.

Figure 2:
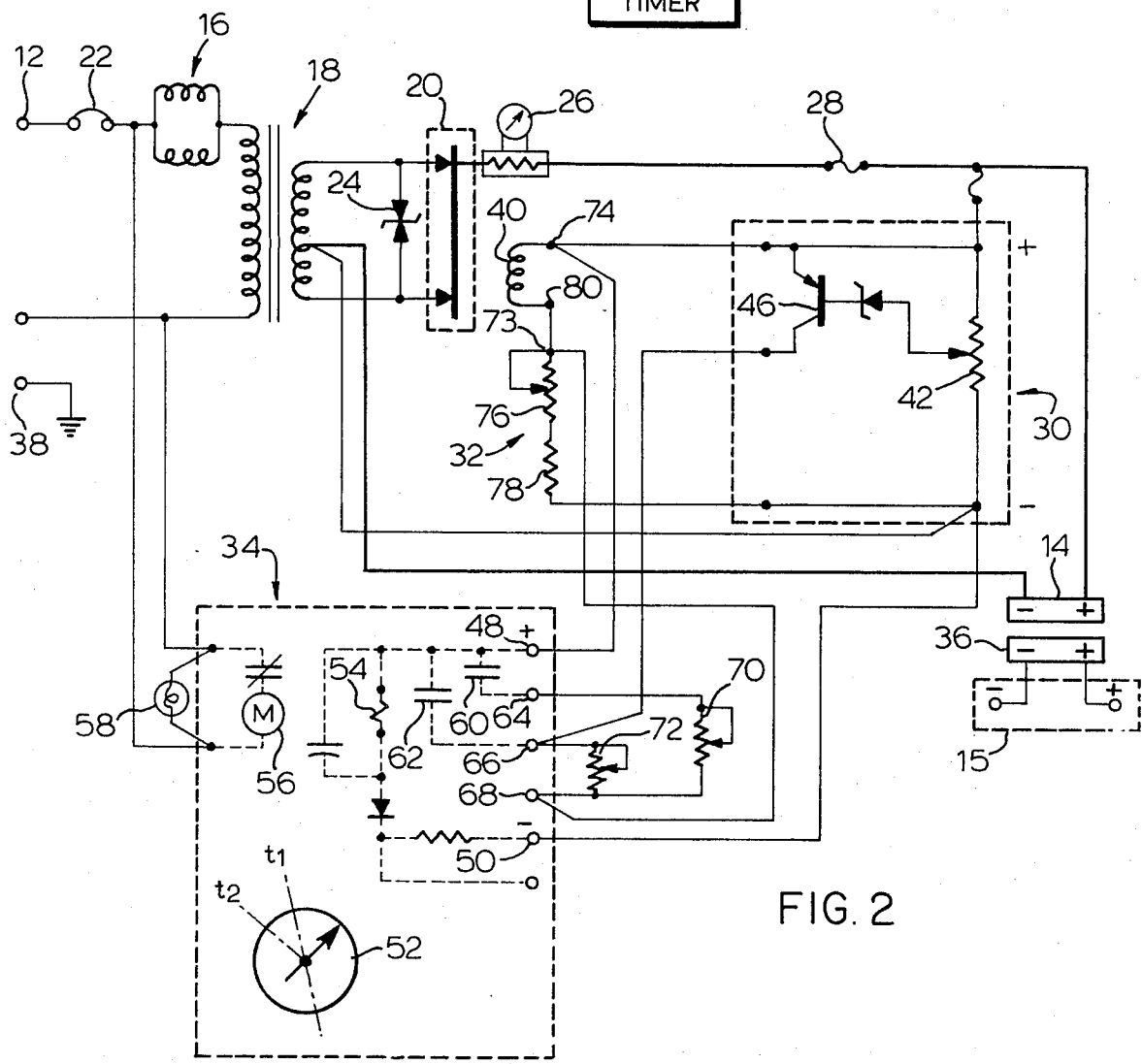
FIG. 2 is a typical circuit of a storage battery charger shown in block form in FIG. 1.

Turning to the circuit of FIG. 2, the various circuit components whose interrelationship are indicated in the block circuit of FIG. 1, are indicated in FIG. 2. A battery, having a connector 36 adapted to mate with the output of the battery charger at 14, is shown at 15. A ground connection for the apparatus, whereby the cabinet of the battery charger may be grounded, is shown at 38.

As noted, the ampere-turns transductor 16 may be a saturable core reactor or a magnetic amplifier; and in any event the ampere-turn transductor has a control coil indicated generally at 40. That control coil is, of course, connected to the constant current adjust means 32, the override and timer 34, and the control circuit 30, as discussed hereafter.

The control circuit 30 includes a potentimeter 42 and a zener diode 44 which act together as a voltage reference sensing means of the output voltage of the battery 15. It will be noted that the potentiometer 42 is connected directly across the output of the battery, and of course of the output of the battery charging circuit. The voltage reference sensing means may include such other voltage dropping strings, amplifiers, etc. as may be required, depending on the voltage and current levels being sensed. A transistor 46 is also included in the control cirucit 30, and the base of the transistor 46 is driven from the voltage reference sensing means through the Zener diode 44. The operation of the control circuit is, of course, discussed in greater detail hereafter; and it may be noted that the control circuit may be similar to that which is taught in applicant's issued Canadian Pat. No. 822,798, dated Sept. 9, 1969. However, for purposes of this discussion, the circuit including potentiometer 42, zener diode 44 and transistor 46 is operable and sufficient to discuss the principles of the charging circuit and its control.

The override and timer circuit 34 includes positive and negative terminals indicated at 48 and 50, which terminals are also connected directly across the output of the charging circuit and of a battery 15 connected thereto. Within the override timer circuit 34 there is included a clutched timer indicated generally at 52, having a clutch 54. The timer may be driven by motor 56, and the circuit may include an indicator lamp 58 connected to indicate when the circuit is energized. Two switches 60 and 62 are included within the override and timer circuit, and each of switches 60 and 62 is operable by the timer at a different point in time during the charging program, as discussed in greater detail hereafter.

The override and timer circuit 34 includes terminals 64, 66 and 68. Internally, switch 60 is connected between terminal 48 and terminal 64; and switch 62 is connected between terminals 48 and 66. Externally, terminal 64 is connected to an adjustable resistor 70, which is also connected to terminal 68. Another adjustable resistor 72 is connected between terminals 66 and 68. In addition, terminal 66 is connected to the collector of transistor 46 in control circuit 30; and terminal 68 is connected to the end 73 of the constant current adjust means 32 which is remote from the negative terminal of the battery charger output. The upper end of the control coil 40 is designated at 74, and is connected to the emitter of the transistor 46 and to the positive side of the output of the battery charger; and as well to the DC positive terminal 48 of the override and timer circuitry 34. The constant current adjust means 32 may include a resistor string having a potentiometer 76 and a further resistor 78. The upper end 73 of the resistor string is connected to the terminal 80 of the control coil 40, and to terminal 68 of the override and timer 34.

Figure 3:
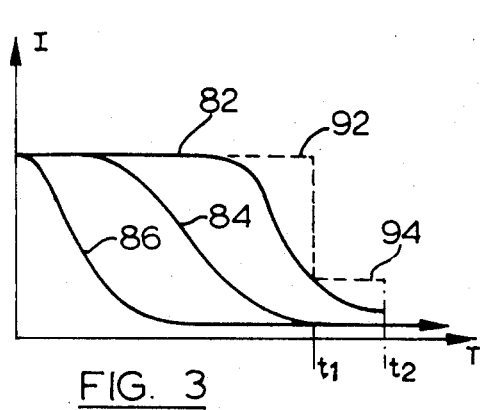
FIG. 3 is a set of curves showing charging current, against time for typical charging operations of lead-acid storage batteries, and showing override limits of curernt against time in accordance with this invention.
Figure 4:
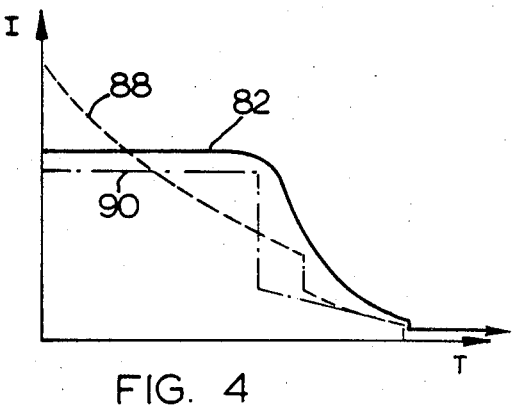
FIG. 4 is a comparison showing charging current against charging time of a charging circuit according to this invention, constant current-type charger and a taper-type charger.

FIG. 3 shows a family of curves indicated generally at 82, 84 and 86; and each of those curves shows a typical charging current versus time charging characteristic of a battery, depending on the discharge condition of the battery when charge is initated. For example, curve 82 is a typical charging curve of a fully discharged battery when it is charged using the charging apparatus of this invention. Curve 84 is a typical charging curve of a battery which is either approximately half discharged or is a half size battery when compared with the battery of curve 82; whereas curve 86 is a typical charging curve of a battery which was nearly completely charged when the charging operation was initiated. It will be noted that in each of curves 82, 84, and 86 there is a gradual, tapered transition from the high initial charging current to the low or trickle charging current, although at different times during the charging operation because of the initial charge condition of the battery. In contradistinction to the family of curves shown in FIG. 3, there is pair of curves 88 and 90 shown in FIG. 4, which are the typical charging output curves of a taper charger and a constant current charger, respectively. Also shown in FIG. 4 is curved 82, for purposes of comparison of the charging characteristic of the battery charging apparatus of this invention with either taper chargers or constant chargers — each of which have high to low step transition characteristics — where each of the curves is related to battery charger operation for an identical, fully discharged battery.

The operation of the battery charging apparatus circuit of FIG. 2 is now discussed, particularly with relation to the curves shown in FIG. 3. It is assumed for moment that the override circuitry whose purpose, function and operation are discussed hereafter, is not needed in view of the normalcy of the charging operations discussed at this time.

When the battery 15 is connected to the battery charging apparatus, and breaker 22 is closed, a DC voltage is impressed across the battery at output 14 of the battery charger. The initial output current rate of the charger is determined by the constant current adjust resistor string, including resistor 78 and potentiometer 76; depending on the terminal voltage of the battery immediately upon initiation of the charging operation. That is to say, if the terminal voltage of the battery is below a predetermined value as sensed by the voltage reference sensing means including zener 44 and potentiometer 42, such as to keep transistor 46 in a non-conducting status as discussed hereafter, then the initial charging current is determined as a function of the amount of current permitted to pass through control coil 40 by the constant current adjust means 32. (It should be noted that neither switch 60 or switch 62 is closed during the initial stages of the battery charging program, and that they are closed sequentially by the timer 52, as discussed hereafter.)

In the normal circumstance, the battery voltage of the discharged battery — which may be partially or fully discharged — may have fallen to as low as 2.1 volts per cell; and in any event, the constant current adjust means 32 ia adjusted so that an output current of approximately 16.5A/100AH occurs.

As the voltage per cell of the battery 15 connected to the battery charging apparatus approaches a predetermined level, the control circuit 30 begins to come into operation. Obviously the predetermined level of voltage per cell of the battery 15 is reflected as a predetermined terminal voltage of the battery, and it is sensed by the control circuit 30 as discussed above. (Normally, using lead-acid industrial storage batteries, the predetermined voltage is 2.4 volts per cell.) When the voltage reaches the predetermined level, transistor 46 begins to become conductive by being driven at its base, and thus the transistor 46 and resistor 72 are shunted across the control coil 40. However, the voltage reference sensing means in the control circuit 30 operates in such a manner as to maintain the terminal voltage of the battery constant at the predetermined level by determining the conduction status of the transistor 46, and thereby the amount of shunting of the control coil 40. It will be seen that as the terminal voltage of the battery is thereby clamped by the control circuit 30 until such time as the transistor 46 becomes fully conductive, the output current from the charging apparatus must decrease because of the continuously greater shunt effect of the transistor 46 and resistor 72 across the control coil 40. Thus, there is established a taper transition from a high initial charging current to a lower charging current, controlled by the control circuit 30, until transistor 46 becomes fully conductive. At that time, a direct shunt of the transistor 46 and the resistor 72 is placed across the control coil 40 of the transducer 16, and no further control of the output current can thereby be achieved. However, it will be noted that resistor 72 is a potentiometer, and is chosen in value and set so that the battery charging circuit has an output current which is a trickle charge to the battery 15, and which is a substantially constant current. (The value of the trickle charge current, for most industrial battery installations, is set at 1A/100AH.)

The above discussion relates particularly to batteries whose charging characteristics are such as illustrated in curves 84 and 86; that is batteries which reach the trickle charge rate before operation of the timed override, as discussed hereafter. The battery whose characteristic is shown in curve 82 also is under control of the control circuit 30, with a taper transition from high initial charging current to low charging current, except that the override is shown to have come into operation as discussed hereafter, at a very late stage during the charging program.

After the transistor 46 becomes fully conductive and the control circuit 30 effectively shunts the control coil 40 so as to establish trickle charge, and voltage clamping of the terminal voltage of the battery charger is no longer effected, the trickle charge may be such as to drive the terminal voltage of the battery up as the battery reaches its full charge state. The terminal voltage may be in the order of 2.40 to 2.60 volts per cell. The reduction of the charging rate to trickle charge may be considered to be under the control of a controllable synchronous switch whose effective controlled operating period is reduced to a predetermined minimum.

At the same time as the charging program begins, the monitoring function of the override and timer circuit 34 also beings, by operation of the timer 52. At a given time $t_1$ during the operation of the timer, switch 60 is closed by the timer, thereby connecting terminals 48 and 64. The potentiometer 70 is thus inserted into the circuit by being shunted across the control coil 40 between points 74 and 80. The value of the potentiometer 70 is chosen and set for a predetermined low level of charging current. The high level of charging current which is controlled by the resistor string 76 and 78 is indicated in FIG. 3 at 92; and the level of output current controlled by potentiometer 70 shunted across control coil 40 and in series with resistor strings 76 and 78 is shown at 94 in FIG. 3. However, in most circumstances, the control circuit 30 including the transistor 46 will have reduced the output current to a level below the level shown at 94 before time $t_1$. Thus, the connection of resistor 70 into the circuit by closing of switch 60 may have no effect because the circuit may already be operating substantially at the trickle rate as determined by the connection of the resistor 72 into the circuit as transistor 46 becomes fully conductive.

(The value of the potentiometer 70 is chosen and set so as to assure a charging current of approximately 5A/100AH.)

At time $t_2$, the timer 52 closes switch 62, thereby connecting terminal 48 to terminal 66, and thus assuring the connection of resistor 72 into the circuit in shunt connection across the control coil 40. As indicated above, the resistor 72 would normally be in the circuit by time $t_2$, because of the operation of the control circuit 30 with transistor 46 becoming fully conductive.

To summarize the operation of the circuits of FIG. 2 as they have so far been described, the control circuit operates to assure a controlled and tapered transition from a high charging rate to a low charging rate, with provision for a continuous trickle charging rate at the end of the charging program and so long as the charger remains energized and the battery being charged remains connected to the charger; whereas the timer and override circuitry operates to assure that a high charging rate does not continue after a certain time period in the charging program, that an intermediate charging rate does not continue beyond another, later time period in the charging program, and to assure that a trickle charging rate is initiated at the end of the charging program and until such time as the charger is de-energized or the battery removed. More specifically, the control circuit 30 includes voltage reference sensing means 44 together with potentiometer 42 and a transistor 46 in series with a resistor 72, where the voltage reference sensing means is connected to drive the base of transistor 46 so as to maintain the output voltage of the battery charger circuit constant at a predetermined level until the transistor is driven substantially to full conduction. At that time, the resistor 72 is shunted across the control coil 40; or in any event, the resistor 72 is shunted across control coil 40 at time $t_2$ in the charging program because switch 62 is closed by the timer 52.

The monitoring and overriding functions of override and timer circuits 34 together with the circuitry of the charging apparatus includes the driven time switch 52 whose operation is initiated at the beginning of the charging program when the battery is first connected to the charger. Current control means 32 are provided and are operable at the beginning of the charging program to maintain the output current at a first predetermined level. The first override occurs at time $t_1$, at which time switch 60 is closed, to assure that the output current of the charger is reduced to a value which is lower than the initial charging rate and which is determined by the value of resistor 70 together with the remaining current control means 32. As pointed out above, the closing of switch 60 overrides the control circuit 30 only when transistor 46 is not conducting at least sufficiently so as to control the output current of the charger apparatus at a level below that determined by the insertion of potentiometer 70 into the circuit. The second override means made operable by the time switch 52 is switch 62 which is closed at time $t_2$ so as to assure that the output current of the charger apparatus is reduced to the trickle charging rate.

It is thus seen that the battery charging apparatus is adapted to control the charging characteristic of a battery, depending on its initial charge status, so that its characteristic is somewhat as indicated by any of the curves of FIG. 3. It will be noted that curve 82 shows the initiation of the trickle charge by operation of the override at time $t_2$.

It is obvious that other batteries having the same terminal voltage but different amp-hour ratings may also be charged, by controlling the length of the charging operation. Thus, the timer 52 is normally adapted to operate over a given period of time — say 8 hours — but it may be extended to operate over a period of ten or twelve hours so that times $t_1$ and $t_2$ during the charging program override as they are determined by the timer and override circuitry 34 may be set back in the program from its initiation by as much as four hours in usual circumstances. The override operation is such that it operates at times during the charging program to cause a step transfer from high rate to low rate or to trickle rate, depending on the time in the charging program, so as to preclude damage to the battery being charged by the charging apparatus. However, if the override apparatus becomes operative particularly at time $t_1$ so as to override the high output current to a low output current, then usually the override has been made to become operative due to some defect of the battery. Such defects may include a shorted cell, low specific gravity of the electrolyte, leakage, etc. as discussed above. In any event, it is desirable that an indication be given such that the battery being charged may be inspected and repaired or replaced, as necessary. To that end, a modification of the circuit of FIG. 2 is provided, including additional alarm circuitry as indicated in FIG. 5.

Figure 5:
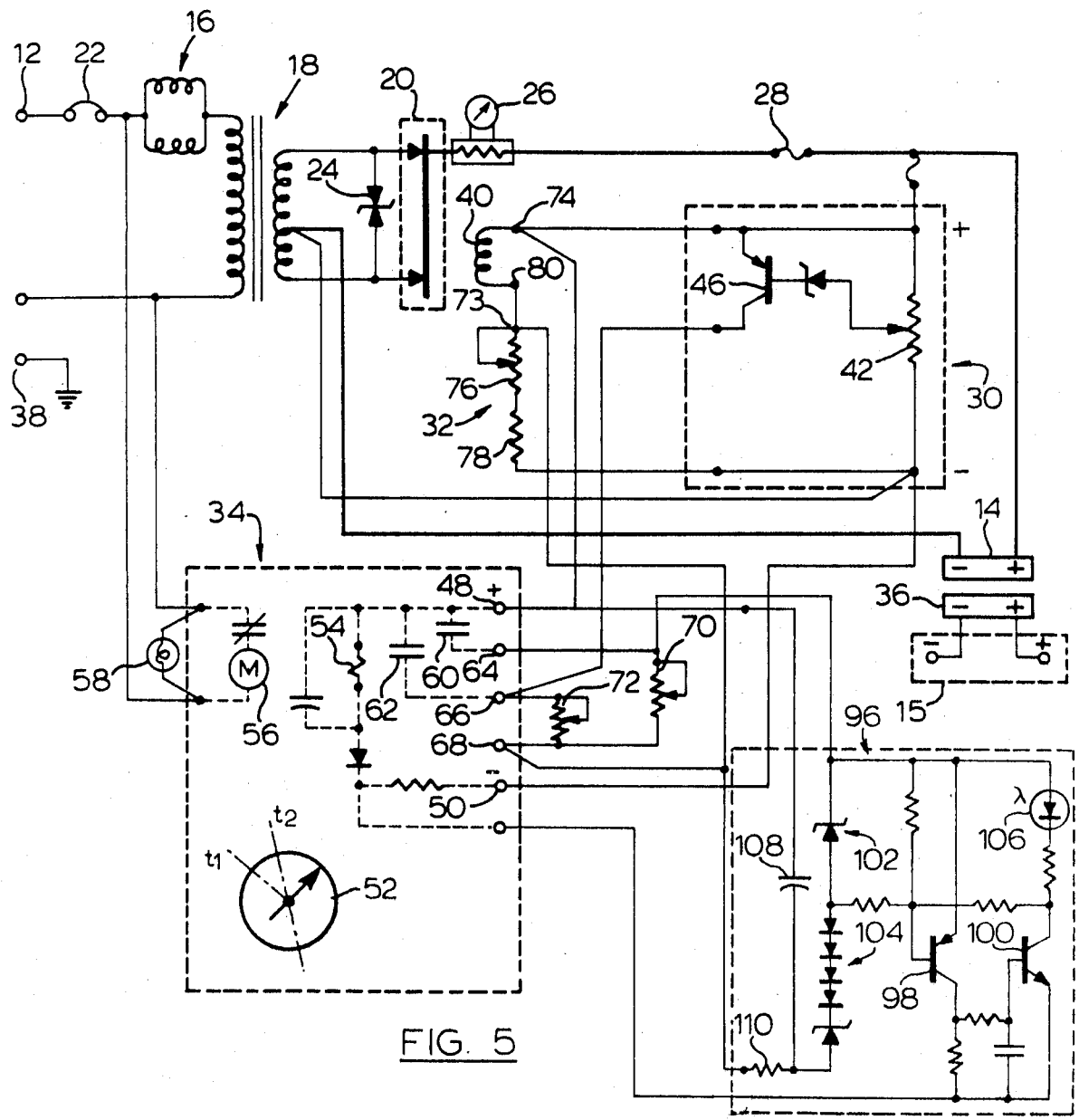
FIG. 5 is a circuit similar to that of FIG. 2, and showing an additional alarm circuit which may become operative under certain conditions so as to warn of probable battery malfunction or failure.

In FIG. 5, an alarm module is indicated at 96, and includes a latching circuit having transistors 98 and 100, zener diode 102, a diode and zener string 104, and an indicator lamp 106. Indicator lamp 106 may be a solid state lamp, having very low current drain.

If the low rate override becomes operative at time $t_1$, by closing switch 60, a high current condition in control coil 40 drives zener diode 102 into conduction, thereby passing a signal voltage to initiate the trigger and latching operation of the latching circuit, and causing lamp 106 to illuminate. The remaining circuitry maintains illumination of the lamp 106 during continuing operation of the charge program, including closing of the switch 62 and the initiation of trickle charging.

Referring briefly to FIG. 4, it will be noted that curves 82, 88 and 90 shown therein are indicative of the operation of charger apparatus according to the present invention, a taper charger and a constant current charger, respectively, for a fully discharged battery of similar rating in each case; and where each of the types of chargers has a transition from high output to low output. However, as noted, the transition from high output to low output of the taper charger and constant current charges is, in each case, a step function. That step function is normally controlled by a voltage sensor which is set at 2.37 volts per cell, and is such as to change the operation of the charger from high to low output. The taper charger is normally operable in its high level at rates as high as 22.5A/100AH; and the constant current charger is normally operable at its high level at approximately 15.5A/100AH. It will be noted that the area beneath curve 82 is greater than the area beneath either of curves 88 or 90, and thus the charger apparatus in accordance with the present invention has a higher amp-hour back-charge capacity. It will also be noted that each of the taper and constant current charger is set to turn off at the end of its program, whereas the charger of the present invention is set to initiate a continuous constant current regulated trickle charge.

Figure 6:
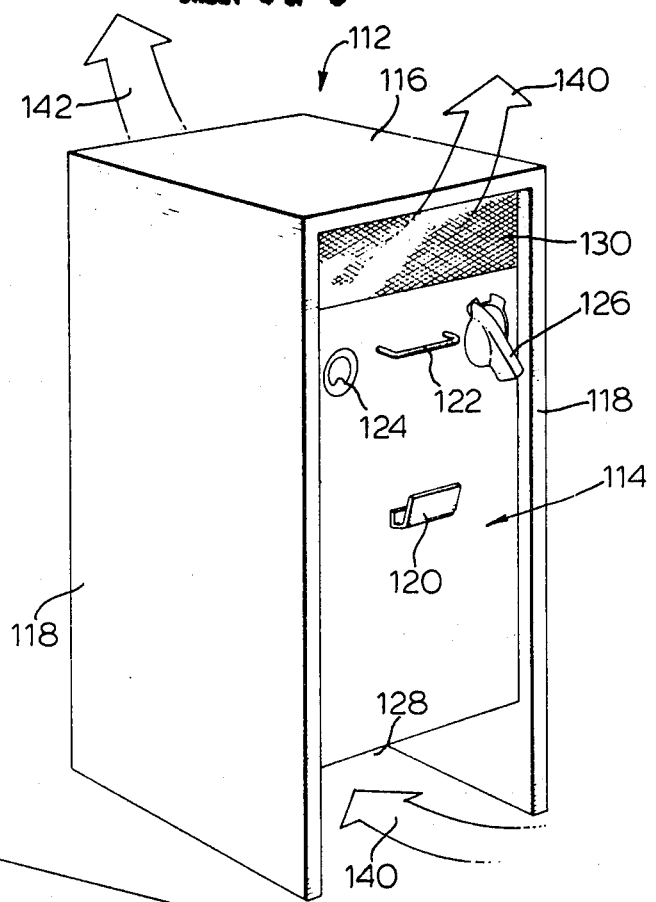
FIG. 6 is a general perspective view of a cabinet according to this invention with the front panel closed.
Figure 7:
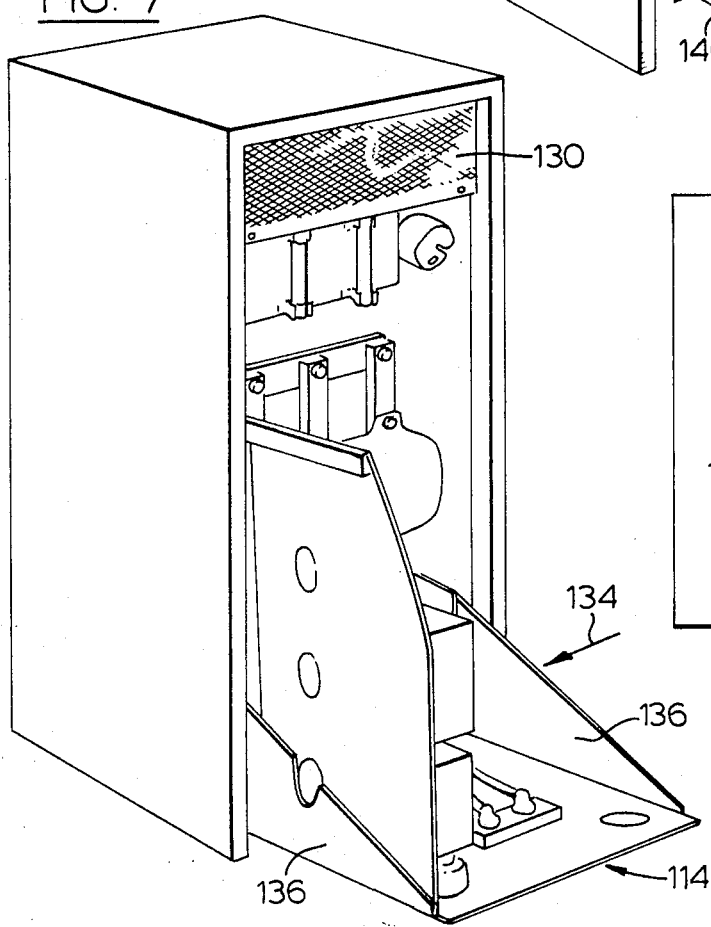
FIG. 7 is a similar view as FIG. 6 with the front panel open.
Figure 8:
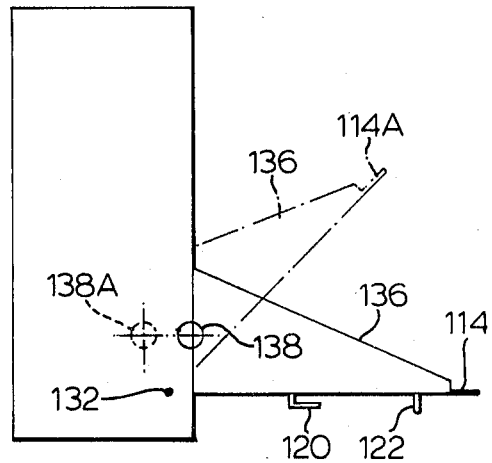
FIG. 8 is a side view of a typical cabinet according to this invention showing the front panel in open and partially opened position.

Turning now to FIGS. 6, 7 and 8, there is shown a cabinet for a battery charging apparatus — or like apparatus — in accordance with another feature of this invention. The cabinet design of this invention provides a cabinet which may be convection cooled, without the use of fans or blowers, which may be placed immediately beside other cabinets of the same design for a "high packing density" of charger or other capacity per unit volume, and which may be stacked for even higher packing density. In addition, the cabinet provides a design whereby a positive closing action of the front of the panel is assured by an "over-centre" balance of the front panel, and where it is necessary only to open interlocks or other protective circuitry to gain access to the interior of the cabinet, without disabling or disconnecting switches, controls, meters, etc. as may be mounted on the front panel. Still further, maximum accessibility and maintainability of the circuit components which are mounted either on the front panel or within the cabinet are realized.

The cabinet 112 has a front panel 114, a top 116 and sides 118. Mounted on the front panel 114 may be a hook 120 on which the DC output cables and connector may be stored when not in use; and a handle 122 is secured to the front panel. Gauges such as meter 124, and an interlock such as indicated at 126 may also be mounted on the front panel 114.

The bottom edge 128 of front panel 114 does not extend entirely to the bottom of the cabinet, leaving a gap beneath it and the surface on which the cabinet is resting. A vent 130 is mounted at the top of the front of the cabinet, and may either be integral with the front panel 114 or integral with the remaining parts of the cabinet and secured between sides 118. The front panel 114 is hinged at 132 to the side panels 118, on an axis indicated in FIG. 7 at 134, and is adapted to be swung down substantially to the position shown in FIGS. 7 and 8.

A pair of side panels 136 may be mounted to the rear face of the front panel 114, and various circuit components may be also mounted to the front panel. One or both of the side panels 136 may co-act with a lip or other device on side panels 118 to form a stop means to limit the amount by which the front panel 114 may be swung open. The limit may be substantially as indicated in FIGS. 7 and 8; and it will be noted that free access to the interior of the cabinet is provided with the front panel in the position shown in FIG. 7 and indicated in solid line in FIG. 8.

The components which are mounted to the front panel 114 are so mounted that the centre of gravity 138 of the components in the front panel 114 is such that when the front panel is in a position such as is shown in dot/dash line in FIG. 8 at 114A — which is substantially one-half of the total arc through which the front panel is permitted to swing — the centre of gravity 138 has moved to a position such as is shown at 138A in FIG. 8 which is behind the axis 134 of hinges 132. In that position, a moment is created counter-clockwise as viewed in FIG. 8 about the axis 134 of hinges 132, and a closing action of the front panel 114 is thereby assured. It is also seen that any of the components mounted on front panel 114 may be easily maintained and have easy accessibility, and that by swinging the panel 114 and some of the major circuit components mounted thereon out of direct blocking position to the interior of the cabinet 112, easy access and maintenance of the remainder of the circuit components mounted therein is possible.

Because the front 128 of the front panel 114 does not extend to the bottom of the cabinet, and vent 130 is provided at the top of the front panel, the interior of the cabinet and the components mounted therein may be convection cooled as shown by arrows 140 which illustrate the flow of air into and from the cabinet 112. An additional rear vent may be also installed in the cabinet to provide for additional air flow as shown at arrow 142. Thus, no fans or blowers are required for cooling, which create noise and have additional power demands; and several cabinets such as those illustrated may be placed immediately side-by-side or — depending upon the strength cabinets — stacked one on top of another.

There has been described a storage battery charging apparatus having multi-rate charging and having a timed monitoring and override circuitry. In the normal operation of the charging apparatus, the transition from high to low current outputs during the charging program of industrial storage batteries is a controlled, tapered transition, at substantially constant voltage. The apparatus is adapted to provide a trickle charge at the end of the charging program at a rate sufficient to overcome internal losses, sulfation, etc., of industrial storage batteries and so as to maintain such batteries at full charge at all times following the completion of a charging program and which such batteries are still connected to the battery charging circuitry. An additional feature has been taught whereby an indication is made and is maintained if the override circuitry becomes operative during the charging program. Such an indication is necessary so that a review of the battery being charged may be made to determine whether the battery needs repair or replacement, because the override circuitry would not normally operate with a battery which is in good repair.

A cabinet design for battery charging apparatus and like apparatus having heavy electronic components mounted therein — which components may become warm during operation, and which may require some maintenance or cleaning — has been described. The cabinet design permits convection cooling of the components mounted within it, and assures a positive closing of the front panel if it is open for access to the interior of the cabinet; while at the same time providing a design whereby it is not necessary to disconnect or dismount any components on the front panel so as to gain access to the interior of the cabinet, and where maintenance of the components in the cabinet and those mounted on the front panel is easy because of the maximum accessibility to them all.

It is obvious that modifications to the circuitry discussed herein can easily be made. The circuits which have been shown and described are ones which are the most simple circuits which can operate inaccordance with the principles of this invention, particularly so as to provide a controlled, constant voltage tapered transition from high output to low output, and having a timed override monitor, all as contemplated and within the scope of the appended claims.

I claim:

1. In a storage battery charging apparatus which is adapted at its input for connection to a source of electrical energy, and at its output to the terminals of a storage battery; said apparatus including controllable synchronous switch means adapted to control the rate of electrical energy input; said apparatus having a multi-rate charging current output program, including a high charging rate at the beginning of the program, a controlled and tapered transition from high to low charging rate, and a continuous trickle charging rate at the end of the program until the battery is disconnected or the charging program terminated; said high charging rate and said trickle charging rate each having a substantially constant current output; the improvement comprising a control circuit and an override and timer circuit, where:

a. said control circuit includes means to initiate operation of a taper charge mode of operation of said battery charger apparatus when the terminal voltage of the battery reaches a predetermined level, said control circuit including means to drive said controllable synchronous switch so as to reduce the rate of electrical energy input by controlling the operating period of said synchronous switch, in order to maintain the output voltage of said battery charger apparatus constant at said predetermined level until such time as the controlled operation period of said synchronous switch reduces to a perdetermined minimum period, or until expiration of a predetermined amount of time from the beginning of the charging program as determined by said override and timer circuit; and b. said override and timer circuit includes means for monitoring and overriding the control circuit, including i. a driven time-switch whose operation is initiated at the beginning of said charging program;

ii. first current control means made operable at the beginning of said charging program to maintain said output current at a first predetermined value;

iii. first override means made operable by said time-switch at a first predetermined time during said charging program to override said control circuit if the output current of said apparatus is higher than a second predetermined value which is lower than said first predetermined value, so as to reduce said output current to said second predetermined value; and iv. second override means made operable by said time-switch to override said control circuit at a second predetermined time which is later than said first time during said charging program, to reduce said output current to said continuous trickle charging rate 2. The storage battery charger apparatus of claim 1 where said controllably synchronous switch means is an ampere-turns transductor having a control coil; and where said means to drive said controllable synchronous switch includes a circuit parallel to said control coil of said ampere-turns transductor, including voltage reference sensing means and a transistor in series with a first resistor; said voltage reference sensing means being connected to drive the base of said transistor when current flow occurs in said voltage reference sensing means so as to maintain the output voltage of said battery charger apparatus constant at said predetermined level until said voltage reference sensing means drives said transistor base substantially to full conduction so as to shunt said first resistor across said control coil.

3. The storage battery charger apparatus of claim 2 wherein said first current control means includes a second resistor in series with said control coil of said ampere-turns transductor across the terminals of said storage battery; said first override means comprises switch means in series with a third resistor and arranged to close at said first predetermined time so as to shunt said third resistor across said control coil; and said second override means includes switch means in series with said first resistor and arranged to close at said second predetermined time so as to shunt said first resistor across said control coil.

4. The storage battery charging apparatus of claim 2 including means on said time-switch to alter at least the second predetermined time of said charging program.

5. The storage battery charging apparatus of claim 2 including means to alter said control circuit so as to change the level of said predetermined battery terminal voltage at which said taper charge operation is initiated by said control circuit.

6. The storage battery charging apparatus of claim 2 including means to alter said first and second predetermined values of output current.

7. The storage battery charging apparatus of claim 2 including means to alter the predetermined value of said trickle charging rate of said output current.

8. The storage battery charging apparatus of claim 3 further including voltage sensing means across said first override means and said control coil to sense high current flow in said control coil, and signal means actuated by said voltage sensing means.

9. The storage battery charging apparatus of claim 8 further including voltage clamping means and amplifier means to maintain actuation of said signal means.

* * * * *